Oct. 11, 1955     W. A. KRUPICKA     2,720,408
PUSH BUTTON CONSTRUCTION
Filed April 11, 1952
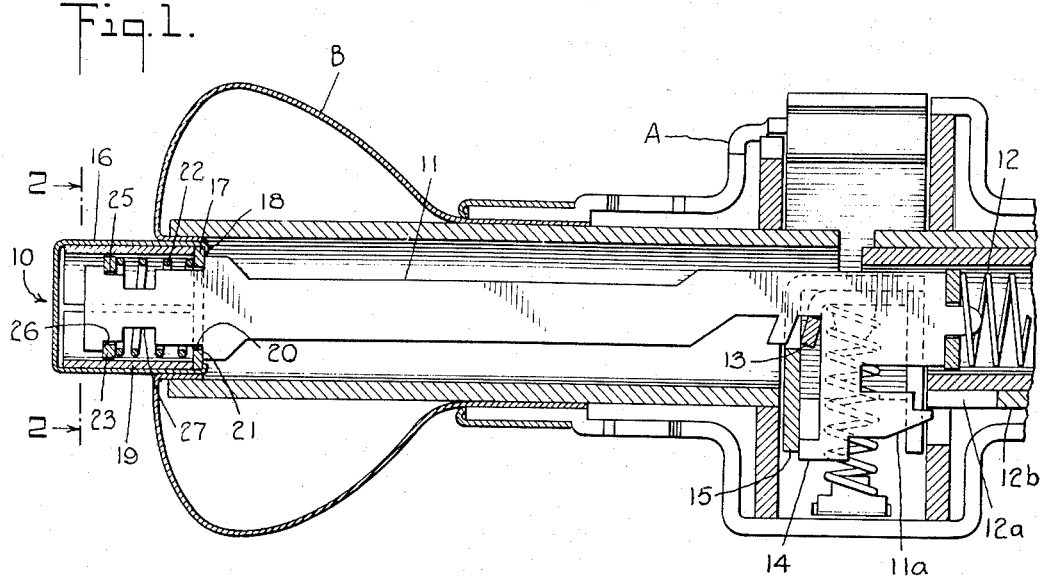
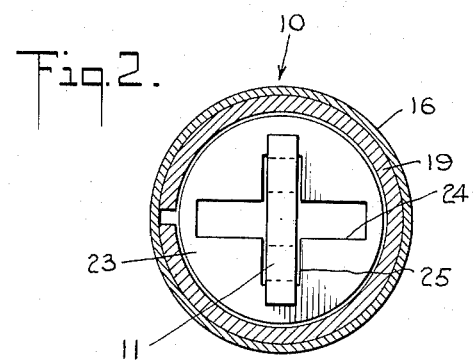
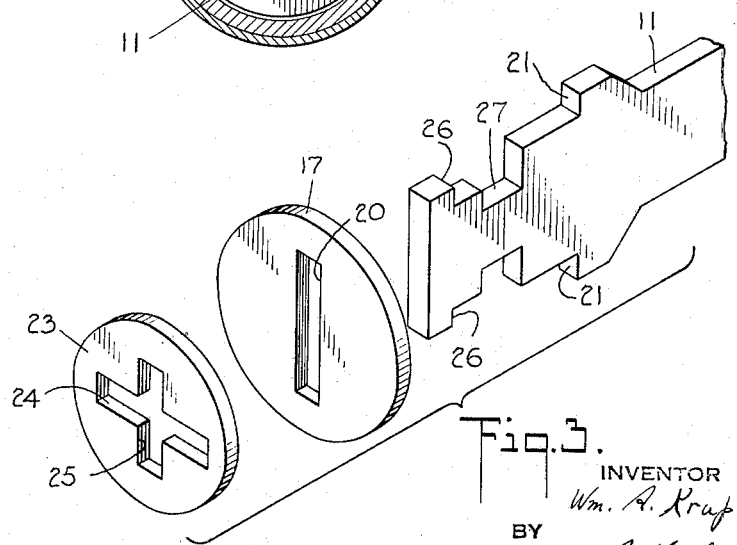
INVENTOR
Wm. A. Krupicka
BY
H. H. Golden
ATTORNEY

United States Patent Office 2,720,408
Patented Oct. 11, 1955

2,720,408

PUSH BUTTON CONSTRUCTION

William A. Krupicka, Byram, Conn., assignor to The Yale & Towne Manufacturing Company, Stamford, Conn., a corporation of Connecticut Application April 11, 1952, Serial No. 281,733

4 Claims. (Cl. 292—169)

This invention relates to the construction and mounting of the push button in push button actuated locks. The push button in locks of the particular class to which my invention relates is secured to a connecting bar through which it locks a bolt retractor or outside bolt-retracting knob and spindle. The push button and connecting bar move inwardly to a locked position against strong spring pressure, and when released from this locked position by a key or other means, the connecting bar and push button are snapped sharply outwardly of the lock by the spring to a release position. In one very desirable construction, a decorative outer shell is utilized in the push button for the sake of appearance and economy, this shell and one or more reinforcing parts being secured to the outer end of the connecting bar as by crimping. This construction of the prior art through which the push button is secured to the connecting bar is relatively strong and durable, but, because the spring is quite strong and presses the connecting bar sharply against a stop with considerable force, there is nevertheless a tendency for the push button to separate from the connecting bar. Therefore, after a period of use, the repeated shock that is caused by the connecting bar striking the stop may damage the means securing the push button to the connecting bar. To prevent this, the prior art has supplied very heavy securing means and a heavy connecting bar. It is the purpose of my invention to contribute a novel push button securing means that will not be susceptible to damage of this kind through the theory of its construction rather than mere ruggedness.

As one very important feature of my invention, I utilize shock absorbing means that yield and thereby absorb the shock that results from engagement of the connecting bar with its stop. The yielding means also retains the push button relatively to the bar, and as a part of this feature of the invention, the yielding means normally maintains the push button against an abutment on the connecting bar so as to afford positive movement of the bar when the push button is pressed inwardly.

As another detailed feature of the invention, I form the yielding means as a coil spring, and I mount this spring on the end portion of the connecting bar within the push button. Preferably, the spring is retained on the bar by a washer that is very easily assembled with the bar through particular coacting formations of the bar and washer, and the spring holds the push button against the abutment on the connecting bar through pressure upon the member to which the outer parts of the push button are attached.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawing, Fig. 1 is a longitudinal sectional view showing a preferred form of my novel push button assembled with a lock. Fig. 2 is a cross-sectional view of the push button taken on the line 2—2 of Fig. 1. Fig. 3 is an exploded view of parts of the push button and the connecting bar.

I have indicated my novel push button in the drawings by the numeral 10, and for purposes of description I have shown the push button assembled in a lock A having a knob B. The push button 10 slides in the usual way in a central aperture in the knob B, and is attached to the outer end of the connecting bar 11 through a particular construction that will be hereinafter described in detail. When the push button 10 is pressed, the connecting bar 11 moves inwardly against the force of a coil spring 12 in the lock so that a locking extension 11a on the bar 11 enters a slot 12a in the outer retractor tube 12b, thereby locking this tube against rotation. In moving inwardly, the connecting bar 11 becomes latched in locking position by a latch member 13, and when this latch member subsequently releases the connecting bar, the spring 12 moves the bar outwardly and causes a finger 14 on the bar to strike a stop member 15 that limits the outward movement of the bar. Because the coil spring 12 is made relatively strong in order to prevent accidental inward movement of the push button 10 due to slamming of the door in which the lock is mounted, it will be observed that a definite shock will be produced in the connecting bar 11 by the engagement of its finger 14 against the stop 15. By my invention, I prevent this shock from being transmitted to the push button 10. It is to be understood that the particular detailed construction of the lock is not important to my invention, and I have described certain features of this lock merely to afford a clear understanding of the invention.

In the extremely novel construction that I have now provided, I utilize in the preferred form of the push button 10 a decorative cylindrical outer shell 16, and a washer 17 that forms an inner end wall of the push button, the shell being retained upon this washer by spinning or crimping over the edge of the shell as shown at 18. Because the material of the outer shell 16 may be quite thin, the shell preferably is assembled with an inner reinforcing tube 19 that is retained therein by its abutment with the washer 17. The push button 10 slidably receives the outer end portion of the connecting bar 11, which in the example illustrated is flat in form. The washer 17 is provided with a slot 20 for this purpose, and the opposed edges of the bar 11 are formed with abutment shoulders 21 against which the washer 17 engages, so that when the push button is pressed the connecting bar 11 will be moved inwardly to actuate the lock, as will be understood by those acquainted with the art.

Normally holding the push button 10 against the shoulders 21 is a coil spring 22 disposed around the outer end portion of the connecting bar 11 within the push button. This spring 22 is engaged at its ends between the washer 17 and a washer 23 that is retained upon the bar 11. The washer 23 is of a size that does not interfere with the sliding of the push button 10 upon the connecting bar 11, and preferably serves as a guide to hold the push button in proper alignment. As a particular means to facilitate assembly of the washer 23 with the bar 11, I form this washer with crossed slots 24, 25, the slot 24 being the longer of the two and proportioned so that the end of the bar may be inserted through it. The connecting bar 11 is provided at its opposed edges with an inwardly stepped formation that provides adjacent the end of the bar a pair of shoulders 26, and inwardly thereof toward the shoulders 21 a reduced neck 27. The neck 27 is proportioned to permit rotation of the washer 23 at the juncture of the slots 24, 25, so that when the washer 23 is pressed onto the bar 11 against the force of the spring 22, the relatively short slot 25 may be turned into alignment with the bar, and the washer 23 when released will then be pressed by the spring against the shoulders 26, being thereby securely assembled to the bar. This assembling operation will of course be performed as a preliminary to the assembly of the outer shell 16 to the washer 17, and when the shell is applied to the washer 17 and crimped at 18, the inner parts of the push button and connecting bar will be completely enclosed.

It will now be apparent that, because of the described construction, the push button 10 may move outwardly relatively to the connecting bar 11 through yielding of the spring 22. This movement is sufficient to absorb the shock that would otherwise be transmitted to the push button when the connecting bar 11 strikes the stop member 15, and therefore the outer shell 16 and the tubular inner member 19 will not as a result of this shock be damaged or thrown off from the connecting bar 11. The washer 23 does, of course, coact with the spring 22 to limit the possible outward movement of the push button, so that while the spring cushions this movement the push button will not in any event slide off from the bar 11. I believe that the construction and operation of my novel push button will now be clear, and that its advantages will be apparent to those acquainted with the art.

I now claim:

1. In a lock of the class described, a connecting bar moving inwardly to actuate a locking mechanism and outwardly by a spring means against a stop when releasing said locking mechanism, a push button fitted about the outer end of the connecting bar, an abutment on said connecting bar whereby said push button when pressed inwardly of said lock moves said connecting bar inwardly, a spring between said connecting bar and push button pressing said push button against said abutment and retaining said push button on said connecting bar, said spring yielding to permit said push button to move relatively to said connecting bar away from said abutment when said connecting bar strikes said stop.

2. In a lock of the class described, a connecting bar moving inwardly to actuate a locking mechanism and outwardly by a spring means against a stop when releasing said locking mechanism, a push button mounted about said connecting bar, and a spring between said connecting bar and said push button holding said push button in one position on said connecting bar, said spring yielding to permit said push button to move relatively to said connecting bar away from said position when said connecting bar strikes said stop whereby to absorb shock resulting from impact of said connecting bar against said stop.

3. In a lock of the class described, a hollow push button, a flat connecting bar, an end wall on said push button having a slot through which said connecting bar enters said push button, said connecting bar having within said push button edges that are stepped inwardly from the end of said connecting bar, a washer on the stepped edges of said connecting bar, said washer having crossed slots of unequal length whereby said washer admits the end of said connecting bar and is retained by outer steps on said connecting bar when said washer is turned relatively thereto, an abutment on said connecting bar whereby said push button when pressed moves said connecting bar in one direction, and a spring engaged between said slotted end wall of said push button and said cross-slotted washer whereby to hold said push button against said abutment, said spring holding said washer seated against said stepped edges of said connecting bar and yielding to allow said push button to slide on said connecting bar away from said abutment in a direction opposed to said one direction.

4. In a lock of the class described having a locking mechanism, a connecting bar moving inwardly to actuate said locking mechanism, a push button fitted about the outer end of said connecting bar, means for latching said connecting bar in locking position, a spring moving said connecting bar outwardly away from locking position when released from said latching means, and a stop against which the connecting bar is moved by said spring, the improvement that comprises a retaining spring pressing between said connecting bar and said push button to hold said push button yieldingly against a part of said connecting bar, and said spring yielding to allow the push button to move on the connecting bar away from said part of said bar when the connecting bar strikes said stop.

References Cited in the file of this patent

UNITED STATES PATENTS

| | | |
|---|---|---|
| 1,918,719 | Schlage | July 18, 1933 |
| 1,991,822 | Snipes | Feb. 19, 1935 |
| 2,038,907 | Schlage | Apr. 28, 1936 |
| 2,210,080 | Hover et al. | Aug. 6, 1940 |
| 2,228,674 | Raymond | Jan. 14, 1941 |
| 2,346,656 | Berghoff | Apr. 18, 1944 |
| 2,460,607 | Sullivan | Feb. 1, 1949 |